Dec. 25, 1956  H. J. SMITS  2,775,131
MECHANICAL DRIVE
Original Filed Nov. 17, 1949
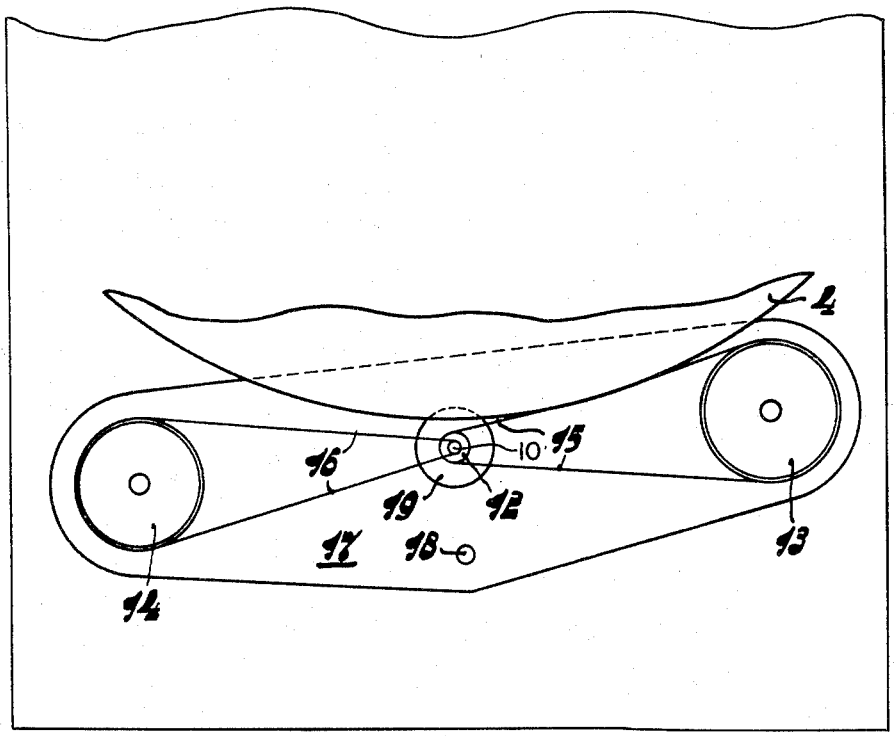
INVENTOR.
HUBERTUS JAN SMITS
BY
AGENT

United States Patent Office 2,775,131
Patented Dec. 25, 1956

2,775,131
MECHANICAL DRIVE

Hubertus Jan Smits, Eindhoven, Netherlands, assignor to Hartford National Bank and Trust Company, Hartford, Conn., as trustee Original application November 17, 1949, Serial No. 127,907, now Patent No. 2,664,758, dated January 5, 1954. Divided and this application April 16, 1953, Serial No. 356,629

Claims priority, application Netherlands November 24, 1948

2 Claims. (Cl. 74—221)

This invention relates to a driving mechanism and more particularly to a mechanical drive for operating a turntable employed in phonograph apparatus. The present application is a divisional application of my co-pending application Serial No. 127,907, filed November 17, 1949, now Patent No. 2,664,758.

It is an object of the present invention to provide a turntable drive having a drive shaft and a driving pulley driven by a motor which drives two belts that are disposed on opposite sides of the driving pulley. The belts of each of the two guide or driven pulleys are mounted on a pivotable plate in such a manner that the plate can be moved laterally to bring the outer surface of either of said two belts against the circumference of the driven member. The pulleys on the main drive shaft are of different diameters thus giving different linear speeds to the two belts and consequently alternate driving speeds for the driven member.

It is a further object of the present invention to provide a phonograph turntable drive which permits the alternative playing of records at the usual speeds or the playing of so-called long-playing records at a lower speed with the same equipment.

Another object is to provide a vibration-free drive which is especially useful for driving phonographs.

In order that the invention may be carried into effect the same will now be described in detail with reference to the accompanying drawings in which The single figure is a diagrammatic view of a phonograph turntable drive embodying the present invention.

Referring more particularly to the drawing in detail, a drive shaft 10 has a drive pulley 12 secured thereto. Driven pulleys 13 and 14 are arranged on either side of drive shaft 10 and in the embodiment shown herein a line through the axes of the pulleys 12, 13 and 14 is in a single plane. It is also within the scope of the present invention to provide driving and driven pulleys in two planes subtending an angle at the driving pulley axis. A driving belt 15 passes around the pulley 12 and the pulley 13 while belt 16 passes around drive shaft 10 and pulley 14. Since belts 15 and 16 pass over different circumferences of shaft 10 and pulley 12 respectively, different linear speeds are in effect for each belt. Preferably the shafts of driven pulleys 13 and 14 are mounted on a common mounting plate 17 which pivots at 18 in order to permit either the belt 15 or belt 16 to be brought alternatively into engagement with the turntable 4 while the stress of the aforesaid belts are unvaried substantially for either speed. If desired, the required driving belt pressure against the turntable circumference may be maintained by applying a moment to the mounting plate about its pivot and in the direction of the turntable, for example by means of a resilient mounting (not shown). As may be seen from the figure, the driving shaft 10 with the pulley 12 is adapted to project through the aperture 19 of the mounting plate 17.

It is to be understood that the driving shaft 10 to which drive pulley 12 is secured is the shaft of a driving motor (not shown), however, it is within the scope of the present invention to couple the drive shaft and drive pulley to a motor shaft by any transmission which is substantially free from back-lash.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A phonograph driving mechanism comprising a base, a turntable member, a pivoted mounting plate on said base and provided with an opening therethrough, a pair of driven pulleys spatially mounted on said mounting plate, a drive shaft positioned in said opening and located between said driven pulleys and having two driving pulleys of different diameters, two endless belts, one of said belts encircling one of said driving pulleys and one of said driven pulleys while the other belt encircles said other driving pulley and other driven pulley, said driven pulleys being so mounted on said pivoting plate whereby the former can be moved laterally relative to the axis of said turntable member, and either of said belts may be thus moved into and out of engagement with the circumference of said turntable member.

2. A phonograph driving mechanism comprising a base, a turntable member, a pivoting mounting plate on said base and provided with an opening therethrough, a driven pulley at opposite ends of said mounting plate, a driven shaft positioned in said opening and located between said driven pulleys and having two driving pulleys of different diameters whereby a single plane passes through the axes of said drive shaft and driven pulleys, two endless belts, one of said belts encircling one of said driving pulleys and one of said driven pulleys while the other belt encircles said other driving pulley and other driven pulley, said driven pulleys being so mounted on said pivoting plate whereby the former can be moved laterally relative to the axis of said turntable member and either of said belts may be thus moved into and out of engagement with the circumference of said turntable member.

References Cited in the file of this patent

UNITED STATES PATENTS

| 365,051 | Crowell | June 21, 1887 |
|---|---|---|
| 936,948 | Russell | Oct. 12, 1909 |
| 1,152,377 | Altorfer | Aug. 31, 1915 |
| 1,169,854 | Merritt | Feb. 1, 1916 |
| 1,350,179 | Ransome | Aug. 17, 1920 |
| 2,509,054 | Davis | May 23, 1950 |
| 2,664,758 | Smits | Jan. 5, 1954 |